United States Patent [19]

Denton et al.

[11] Patent Number: 4,488,433

[45] Date of Patent: Dec. 18, 1984

[54] CRASH TEST DUMMY LOWER LEG STRUCTURE

[75] Inventors: Robert A. Denton, Troy; Craig R. Morgan, Auburn Heights, both of Mich.

[73] Assignee: Robert A. Denton, Inc., Rochester, Mich.

[21] Appl. No.: 447,876

[22] Filed: Dec. 8, 1982

[51] Int. Cl.³ .................... G01N 33/00; G09B 23/32
[52] U.S. Cl. .................... 73/432 R; 434/274
[58] Field of Search .................... 73/432 J; 434/274; 3/5, 30, 31, 32; D24/33

[56] References Cited

U.S. PATENT DOCUMENTS

| | | | |
|---|---|---|---|
| 3,196,463 | 7/1965 | Farneth | 3/32 |
| 3,400,408 | 9/1968 | Garcia | 3/32 X |
| 3,557,471 | 1/1971 | Payne et al. | 434/274 X |
| 4,349,339 | 9/1982 | Daniel | 434/274 |

FOREIGN PATENT DOCUMENTS

| | | | |
|---|---|---|---|
| 2358716 | 3/1978 | France | 73/432 J |
| 2452752 | 11/1980 | France | 72/432 J |
| 2084025 | 7/1982 | United Kingdom | 3/30 |

Primary Examiner—James J. Gill
Assistant Examiner—Joseph W. Roskos
Attorney, Agent, or Firm—Barnes, Kisselle, Raisch, Choate, Whittemore & Hulbert

[57] ABSTRACT

A crash test dummy lower leg structure having a lower leg unit consisting of a tibia member provided with upper and lower tibia sensors. An ankle-foot assembly connected to the lower tibia sensor has a ball and socket connection between the ankle shell and foot member. Means are provided to restrict movement of the ball, to which the foot member is connected, to rotation about three mutually perpendicular axes which intersect at the center of the ball. A knee clevis sensor is connected to the upper tibia sensor and has a pair of spaced parallel members designed to sense and measure force along a line between the knee pivot and the ankle pivot.

15 Claims, 7 Drawing Figures

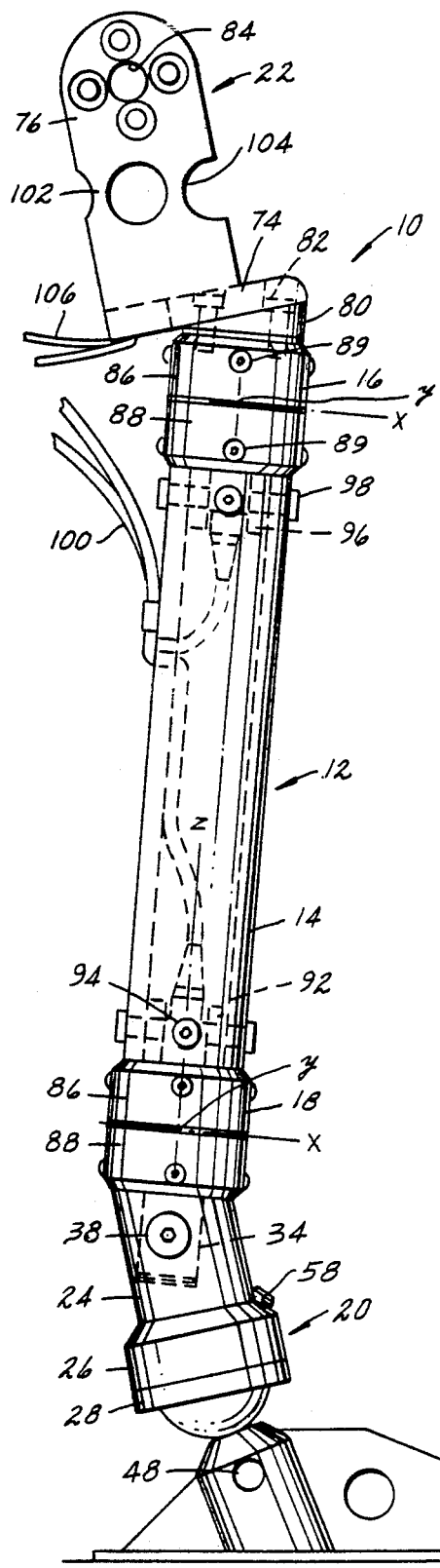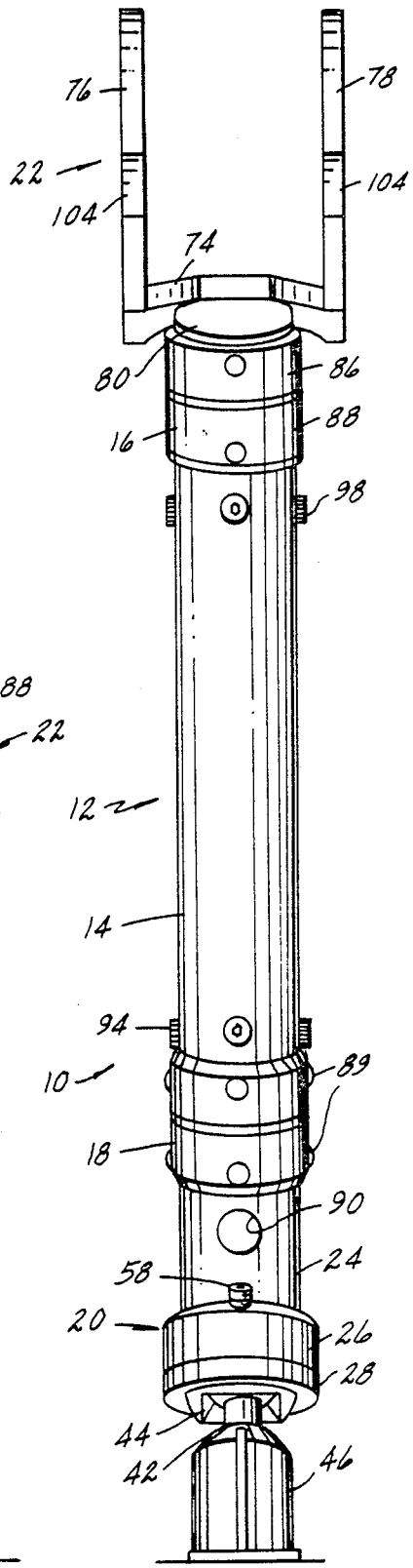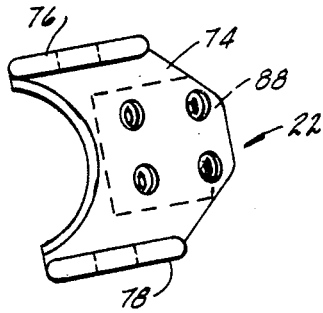

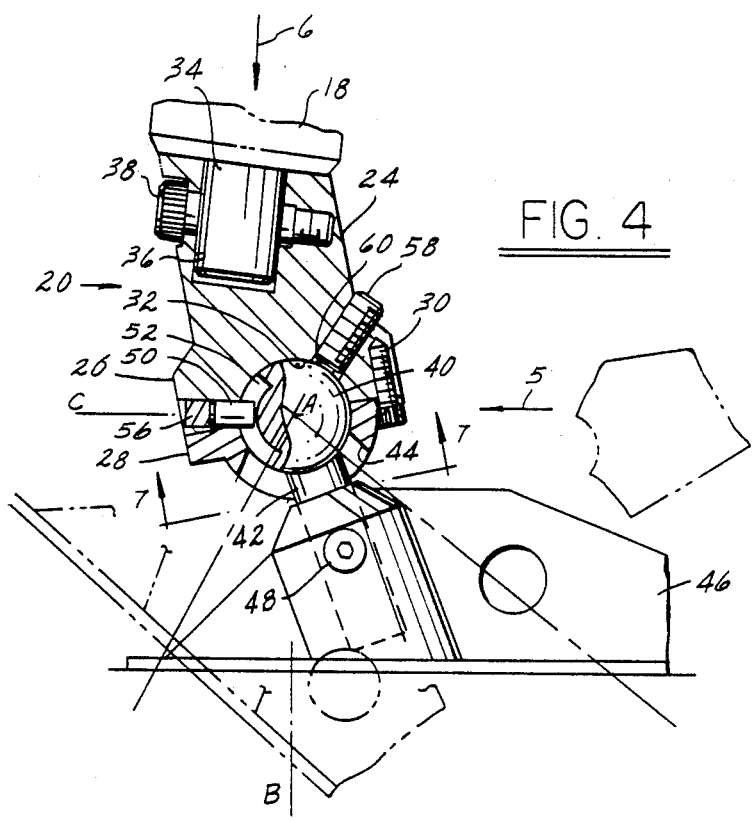
FIG. 4
FIG. 5
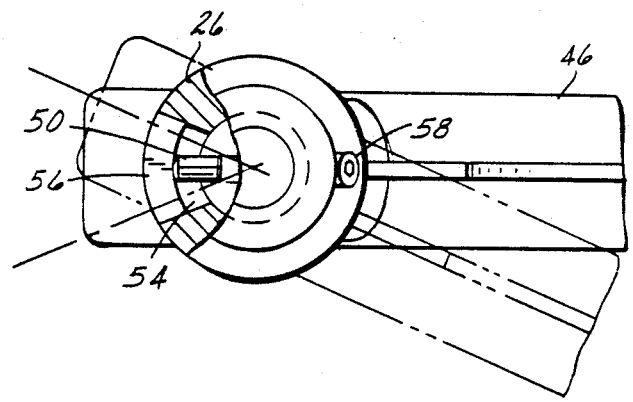
FIG. 6
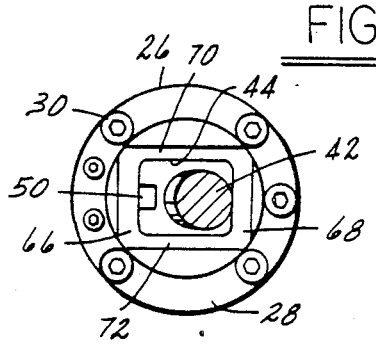
FIG. 7

CRASH TEST DUMMY LOWER LEG STRUCTURE

This invention relates generally to crash test dummies, and refers more particularly to a lower leg structure for a crash test dummy.

SUMMARY OF THE INVENTION

The crash test dummy lower leg structure of this invention comprises a lower leg unit which includes an elongated tibia member, an upper tibia sensor for measuring load forces secured to the upper end of the tibia member, and a lower tibia sensor for measuring load forces secured to the lower end of the tibia member. The sensors have impact-resistant covers and are removable so as to be replaceable and also to permit easier calibration and adjustment.

The lower leg structure has an improved ankle-foot assembly comprising an ankle shell forming a spherical socket, a ball movably fitted in the socket, a stem projecting from the ball through an opening in the shell for connection to a foot member, and means restricting the movement of the ball to rotation about three mutually perpendicular axes which intersect at the center of the ball.

The lower leg structure has a knee clevis sensor preferably of generally U-shape, the base of which is secured to the upper tibia sensor. The two side elements of the knee clevis sensor measure forces along a line between the knee pivot and the ankle pivot.

The foregoing and other objects will become more apparent as the following description proceeds, especially when considered with the accompanying drawings.

BRIEF DESCRIPTION OF THE DRAWINGS

FIG. 1 is a side elevational view of a crash test dummy lower leg structure constructed in accordance with the invention.

FIG. 2 is a front elevational view of the lower leg structure shown in FIG. 1.

FIG. 3 is a detail of the knee clevis sensor looking in the direction of the arrow 3 in FIG. 1.

FIG. 4 is an enlarged fragmentary view, with parts in section, of a portion of FIG. 1.

FIG. 5 is an elevational view looking in the direction of the arrow 5 in FIG. 4.

FIG. 6 is an elevational view, with parts in section, looking in the direction of the arrow 6 in FIG. 4.

FIG. 7 is a view taken on the line 7—7 in FIG. 6.

DETAILED DESCRIPTION

Referring now more particularly to the drawings, the numeral 10 designates a crash test dummy lower leg structure having a lower leg unit 12 consisting of a tibia member 14 and upper and lower tibia sensors 16 and 18, an ankle-foot assembly 20 and a knee clevis sensor 22.

The ankle-foot assembly 20 comprises an ankle shell 24 composed of an upper shell part 26 and a lower shell part 28 secured together by fasteners 30. The confronting surfaces of the two shell parts 26 and 28 have hemispherical recesses and when secured together by fasteners 30 these recesses cooperate to define a spherical socket 32.

The lower tibia sensor 18 has a downwardly extending cylindrical mounting element 34 removably secured in a cylindrical socket 36 in the upper shell part by a fastener 38.

A ball 40 is rotatably fitted within the spherical socket 32. The ball has a radial stem 42 which extends through an opening 44 in the lower shell part and is connected to a foot member 46 by a fastener 48.

The ball 40 is restricted in its movement to rotation about three mutually perpendicular axes which intersect at the center of the ball, by means including a cylindrical pin 50. One end of this pin projects into an arcuate slot 52 in the ball. The opposite end of the pin projects into an arcuate slot 54 in the upper shell part 26. The two slots 52 and 54 lie in planes passing through the center of the ball. The width of the slots approximates the diameter of the pin so that the pin has a close sliding fit therein. In the upright position of the lower leg structure shown in FIGS. 1 and 4, the pin 50 is horizontal and extends from front to rear, the slot 52 in the ball extends vertically and the slot 54 in the upper shell part extends horizontally.

The slot 54 opens through the exterior surface of the upper shell part to permit the pin 50 to be assembled and disassembled. Normally, the pin 50 is retained in assembly by a stop pin retainer 56 removably secured in the outer end of the slot 54 by set screws.

A friction adjustment screw 58 is threaded into the upper shell part 26 and has a friction tip 60 of nylon or the like bearing against the ball to hold it against accidental movement. The screw 58 may be tightened or loosened depending upon the amount of friction resistance desired.

With the lower leg structure in the upright position shown in FIGS. 1 and 4, the foot may be moved forwardly and rearwardly to the limiting positions shown in dot-dash lines in FIG. 4, such movement being limited by engagement of stem 42 with the opposite sides 66 and 68 of opening 44 and being controlled by the slot 52. In the upright position of the leg structure shown in FIG. 4, such forward and rearward movement takes place about a horizontal axis A through the center of ball 40 extending from side to side of the leg structure.

The foot may also be moved left and right so as to toe in or out as will be understood with reference to FIG. 6, such movement being controlled by the horizontal slot 54 in the upper shell part. Such left and right movement takes place about a vertical axis B through the center of the ball.

The foot may also be rotated side to side about a horizontal axis C extending through the ball and coinciding with the longitudinal axis of the pin.

Each of the axes A, B and C is perpendicular to the plane of the other two, or stated another way, the axes are mutually perpendicular.

Opening 44 is formed in a curved wall of the lower shell part 28, and, when viewed as in FIG. 7, is rectangular. The two opposite sides 66 and 68 of opening 44 are parallel to the axis A, and the two remaining opposite sides 70 and 72 are parallel to the axis C.

The amount of total forward-rearward foot movement about axis A depends upon the distance between opposite sides 66 and 68 of opening 44. The amount of total forward-rearward foot movement may vary, but in the present instance, about 80° of such movement is permitted. 80° is considered to approximate the actual forward-rearward range of a human foot. The slot 52, of course, must be long enough to allow that amount of forward and rearward movement.

The amount of total side-to-side movement about axis C depends upon the distance between opposite sides 70 and 72 of the opening 44. The amount of total side-toside foot movement may vary, but in the present instance, about 46° of such movement is permitted. 46° is considered to approximate the actual side-to-side range of a human foot.

Because of the rectangular shape of opening 44, the full side-to-side range of foot movement about axis C is possible in any forward or rearward position of the foot, and the full forward and rearward range of foot movement about axis A is possible in any side to side position of the foot. Also, full rotation about axis B is possible in any of the forward-rearward or side-to-side positions.

The knee clevis sensor 22 is of generally U-shape, having a base 74 and two parallel side elements 76 and 78 projecting from the ends of the base at right angles thereto. The base includes a wedge-shaped mounting portion 80 and is removably secured to the upper tibia sensor 16 by fasteners 82. The side elements 76 and 78 of the knee clevis sensor 22 have aligned openings 84 defining the knee joint of the leg structure.

The upper and lower tibia sensors 16 and 18, sometimes referred to as load cells or force transducers, are provided to sense and measure the direction and magnitude of forces on the lower leg structure when subjected to impact in standard crash test procedures. Such sensors have an integral body of a high modulus of elasticity, such as tool steel or aluminum, encased in impact-resistant cylindrical covers 86 and 88 to which they are secured by fasteners 89. The details of construction of the integral body are not a part of this invention; however, the body may be divided into at least two major portions interconnected by struts of substantially reduced cross-section constituting flexural ares to which strain gage resistors are applied. The covers 86 and 88 protect the body and particularly the resistors from damage due to impact during testing. The resistors are connected for measurement of forces along a particular axis in a network which may be a Wheatstone bridge or variation thereof to measure changes in electrical resistance. As a change in electrical resistance occurs in one or more legs of the bridge network, an unbalance condition occurs which produces a reading on a volt meter. Examples of typical sensors or load cells are shown and described in U.S. Pat. No. 3,771,359.

The lower tibia sensor 18 is designed to sense and measure forces along the z-axis which coincides with the longitudinal axis of the elongated, tubular tibia member 14, and along the y-axis which extends from side to side of the leg structure. It is designed also to sense and measure the moments of force about the x-axis which extends from front to rear of the leg structure. The x, y and z axes intersect at a common point and are mutually perpendicular.

The upper tibia sensor 16 in this instance is designed to sense and measure moments of force about the x and y axes which are parallel to the x and y axes of the lower tibia sensor 18.

The upper shell part 26 has transverse bores 90 which intersect at right angles and either of which will receive the fastener 38 that passes through a bore in element 34 to connect the sensor to the upper shell part. Providing two such bores 90 enables the lower tibia sensor 18 to be rotated 90° when mounted on the ankle shell part 26 to shift the direction of force measurement. The lower tibia sensor 18 has a mounting element 92 which is removably secured within the lower end of the tubular member 14 by four fasteners 94. The fasteners 94 are spaced 90° apart to permit the lower tibia sensor 18 to be rotated 90° when assembled.

The upper tibia sensor 16 has a mounting element 96 which is removably secured within the upper end of the tubular tibia member 14 by four fasteners 98. The four fasteners 98 are spaced 90° apart and the four fasteners 82 between the upper tibia sensor and the knee clevis sensor are also spaced 90° apart, permitting the upper tibia sensor to be rotated 90° when assembled. The cables 100 from the strain gages of the upper and lower tibia sensors to the measuring bridge network extend through the tubular tibia member 14 and are protected thereby.

The side elements 76 and 78 of the knee clevis sensor 22 are formed to provide struts 102 and 104 of substantially reduced cross-section, to which strain gage resistors (not shown) are connected. Each of the side elements 76 and 78 is designed to sense and measure force independently along a line between the knee pivot 84 and the ankle pivot at the center of ball 40. Cables 106 extend from the strain gage resistors to suitable measuring bridge network.

We claim:

1. In a crash test dummy lower leg structure, an ankle-foot assembly comprising an ankle shell forming a spherical socket, a ball movably fitted in said socket so as to be capable of rotation about three mutually perpendicular axes which intersect at the center of said ball, a stem projecting from said ball through an opening in said shell for connection to a foot member, and means for precisely controlling and positively restricting the movement of said ball to the aforesaid rotation about said three mutually perpendicular axes only.

2. In a crash test dummy lower leg structure, an ankle-foot assembly comprising an ankle shell forming a spherical socket, a ball movably fitted in said socket, a stem projecting from said ball through an opening in said shell for connection to a foot member, and means restricting the movement of said ball in said socket to rotation about three mutually perpendicular axes which intersect at the center of said ball, said means restricting movement of said ball including a pin movable in an elongated slot in said ball to define the arc of rotation of said ball about one of said axes and also movable in an elongated slot in said shell to define the arc of rotation of said ball about a second of said axes, said pin providing the third axis about which said ball is rotatable.

3. Structure as defined in claim 2, wherein said pin extends generally horizontally in a front to rear direction when said leg structure is in an upright position.

4. Structure as defined in claim 3, wherein one of said slots is disposed in a generally vertical plane and the other is disposed in a generally horizontal plane when said leg structure is in an upright position.

5. Structure as defined in claim 4, wherein said opening in said shell is rectangular.

6. Structure as defined in claim 5, wherein one pair of opposed sides of said opening are parallel to one of said axes and the remaining pair of opposed sides of said opening are parallel to another of said axes.

7. Structure as defined in claim 6, wherein means are provided to frictionally retain said ball from moving in said socket.

8. In a crash test dummy lower leg structure, a lower leg unit including an elongated tibia member, an upper tibia sensor for measuring load forces removably secured to the upper end of said tibia member, and a lower tibia sensor for measuring load forces removably secured to the lower end of said tibia member.

9. Structure as defined in claim 8, including an ankle-foot assembly secured to said lower tibia sensor.

10. Structure as defined in claim 8, including a knee member secured to said upper tibia sensor.

11. Structure as defined in claim 10, including an ankle-foot assembly secured to said lower tibia sensor.

12. In a crash test dummy lower leg structure, a lower leg unit including an elongated tibia member, an upper tibia sensor for measuring load forces removably secured to the upper end of said tibia member, and a lower tibia sensor for measuring load forces removably secured to the lower end of said tibia member, said sensors being capable of being secured to said tibia member in at least two different rotative positions with respect to the longitudinal axis of said tibia member.

13. In a crash test dummy lower leg structure, a lower leg unit including an elongated tibia member, an upper tibia sensor for measuring load forces removably secured to the upper end of said tibia member, a lower tibia sensor for measuring load forces removably secured to the lower end of said tibia member, and a knee clevis sensor of generally U-shape having a base and two parallel side elements projecting from the ends of said base, said base being secured to said upper tibia sensor, each side element having a portion of reduced cross-section constituting a flexure area to which a strain gage is adapted to be applied.

14. Structure as defined in claim 13, including an ankle-foot assembly secured to said lower tibia sensor.

15. In a crash test dummy lower leg structure, a lower leg unit, a knee clevis sensor of generally U-shape having a base and two parallel side elements projecting from the ends of said base, and means mounting said base to the upper end of said lower leg unit, each side element having a portion of reduced cross-section constituting a flexure area to which a strain gage is adapted to be applied.

* * * * *